(12) United States Patent
Nutting et al.

(10) Patent No.: US 12,232,599 B2
(45) Date of Patent: Feb. 25, 2025

(54) GRIP FOR A FOLDABLE ELECTRONIC DEVICE

(71) Applicant: PopSockets LLC, Boulder, CO (US)

(72) Inventors: Judd Nutting, Boulder, CO (US);
Nathan Cook, Boulder, CO (US);
Danielle Williams, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 683 days.

(21) Appl. No.: 17/377,653

(22) PCT Filed: Jan. 17, 2020

(86) PCT No.: PCT/US2020/014132
§ 371 (c)(1),
(2) Date: Jul. 16, 2021

(87) PCT Pub. No.: WO2020/150630
PCT Pub. Date: Jul. 23, 2020

(65) Prior Publication Data
US 2023/0136304 A1   May 4, 2023

Related U.S. Application Data

(60) Provisional application No. 62/906,361, filed on Sep. 26, 2019, provisional application No. 62/794,305, filed on Jan. 18, 2019.

(51) Int. Cl.
*A45F 5/00* (2006.01)
*F16M 13/04* (2006.01)
*H04M 1/04* (2006.01)

(52) U.S. Cl.
CPC ............... *A45F 5/00* (2013.01); *F16M 13/04* (2013.01); *H04M 1/04* (2013.01); *A45F 2200/0516* (2013.01); *A45F 2200/0525* (2013.01)

(58) Field of Classification Search
CPC ............... A45F 5/00; A45F 2200/0516; A45F 2200/0525; F16M 13/04; F16M 11/10;
(Continued)

(56) References Cited

U.S. PATENT DOCUMENTS

| 9,473,608 | B1 | 10/2016 | Sherman et al. |
| 10,156,775 | B2 * | 12/2018 | Zimmermann ...... G03B 17/561 |

(Continued)

FOREIGN PATENT DOCUMENTS

| WO | 2012016158 A2 | 2/2012 |
| WO | 2015036728 A1 | 3/2015 |

OTHER PUBLICATIONS

Transmittal of the International Search Report and Written Opinion issued in PCT/US2020/014132 on Jul. 23, 2020.

*Primary Examiner* — Stephen A Vu
(74) *Attorney, Agent, or Firm* — Irell and Manella LLP (57) ABSTRACT

An expandable device for attachment to a portable electronic device having first and second surfaces includes a button having a top side, a bottom side, and a coupling portion and further includes an elongated body having a top side, a bottom side, and a platform coupling portion. The button is movable between an expanded position and a collapsed position. The bottom side of the platform engages a portion of the portable electronic device and the platform coupling portion engages the coupling portion of the button. When coupled to the positioning platform, the button is movable between a first position where the button is positioned along the first surface of the portable electronic device and a second position where the button is positioned along the second surface of the portable electronic device.

21 Claims, 9 Drawing Sheets

(58) Field of Classification Search
CPC ...... F16M 11/105; F16M 11/38; F16M 13/00; H04M 1/04; H04M 1/0214; H04M 1/21
See application file for complete search history.

(56) References Cited

U.S. PATENT DOCUMENTS

| | | | |
|---|---|---|---|
| 10,798,840 B2 * | 10/2020 | Hoem | H05K 5/0234 |
| 10,859,894 B2 * | 12/2020 | Sherman | G03B 17/563 |
| 11,212,930 B2 * | 12/2021 | Bristol | H02J 7/0044 |
| 11,294,430 B1 * | 4/2022 | Bristol | G06F 1/1605 |
| 2012/0138647 A1 | 6/2012 | Norling | |
| 2013/0069381 A1 | 3/2013 | Sakamoto | |
| 2015/0184799 A1 | 7/2015 | Whitney | |
| 2016/0070156 A1 | 3/2016 | Alster | |

* cited by examiner

GRIP FOR A FOLDABLE ELECTRONIC DEVICE

PRIORITY CLAIM

This application is a National Stage of International Application No. PCT/US20/14132, filed Jan. 17, 2020, which claims priority to U.S. Provisional Patent Application No. 62/794,305, filed Jan. 18, 2019, and U.S. Provisional Patent Application No. 62/906,361, filed Sep. 26, 2019, the entire contents of each of which are hereby incorporated herein by reference.

FIELD OF THE DISCLOSURE

The present disclosure generally relates to expandable devices and, more particularly, to expandable devices that can be attached to a foldable portable electronic device, or to a case for a foldable portable electronic device, that is configured to be used as a grip, a stand, or to otherwise facilitate handling of a foldable portable electronic device.

BACKGROUND

Portable electronic devices, such as tablets and smart phones, are often housed in protective covers or cases in order to protect the device from damage, to provide a grip for handling the device, and/or to provide a stand for propping the device on a surface. Expandable devices and accessories, which may be attached directly to the device or to the case protecting the device, are used for a variety of functions, including propping the device on a surface and providing an expandable grip for handling the device. The expandable devices are typically positioned on and/or coupled to a rear surface of the portable electronic device to allow a user to securely grip the device, and may have decorative buttons that display logos, decals, symbols, or other artistic renderings. However, portable electronic devices may include folding and/or expanding mechanisms that can selectively modify an overall configuration and dimensions of the device.

SUMMARY

In accordance with one aspect, an expandable device for attachment to a portable electronic device having first and second surfaces includes a button having a top side, a bottom side, and a coupling portion and further includes an elongated body having a top side, a bottom side, and a platform coupling portion. The button is movable between an expanded position and a collapsed position. The bottom side of the platform engages a portion of the portable electronic device and the platform coupling portion engages the coupling portion of the button. When coupled to the elongated body, the button is movable between a first position where the button is positioned along the first surface of the portable electronic device and a second position where the button is positioned along the second surface of the portable electronic device.

In some approaches, the expandable mechanism further includes a locking mechanism that is operably coupled to at least one of the button or the elongated body. The locking mechanism selectively retains the button in the first position or the second position.

In some examples, the elongated body is in the form of a track. The coupling portion of the button is slidably constrained within the track such that the button is movable between the first position and the second position. The elongated body may extend along a portion of the first surface of the portable electronic device and a portion of the second surface of the portable electronic device and may be removable from the portable electronic device. In these examples, the locking mechanism may be in the form of at least one detent formed in the track that is adapted to frictionally engage the coupling portion of the button.

In one or more examples, the elongated body is in the form of an elongated pivot arm having a first end and a second end. The first end of the pivot arm is coupled to a pivot member and the coupling portion of the button is coupled to the second end of the pivot arm such that the button is movable between the first position and the second position. The pivot member may be at least partially disposed on the second surface of the portable electronic device, and may be removable from the portable from the portable electronic device. In these examples, the locking mechanism may be in the form of a detent formed on the pivot member adapted to frictionally engage the first end of the pivot arm. Alternatively, or additionally, the locking mechanism may be in the form of a button disposed on the second surface of the portable electronic device that is adapted to engage at least one of the pivot arm or the button to retain the pivot arm in the second position.

In one or more examples, an expandable device for attachment to a portable electronic device having first and second surfaces includes a button having a top side, a bottom side, and a coupling portion and an elongated body defining a top side, a bottom side, and a track. The button is movable between an expanded position and a collapsed position. The bottom side of the elongated body engages a portion of the portable electronic device and the track slidably engages the coupling portion of the button. The button is movable along the track between a first position where the button is positioned along the first surface of the portable electronic device and a second position where the button is positioned along the second surface of the portable electronic device.

In one or more examples, an expandable device for attachment to a portable electronic device having first and second surfaces includes a button having a top side, a bottom side, and a coupling portion and an elongated body having an elongated pivot arm defining a first end and a second end. The button is movable between an expanded position and a collapsed position. The first end of the pivot arm is coupled to a pivot member, and the second end of the pivot arm is coupled to the coupling portion of the button. The pivot member engages a portion of the portable electronic device. The pivot arm is pivotable relative to the pivot member between a first position and a second position. When coupled to the elongated pivot arm, the button is movable between the first position where the button is positioned along the first surface of the portable electronic device and the second position where the button is positioned along the second surface of the portable electronic device.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, expandable devices for foldable portable electronic devices are provided that include a platform and a button that is movable relative to the platform between a collapsed configuration and an expanded configuration. Traditionally, these expandable devices are positioned on and/or coupled to a rear surface of the portable electronic device and allow a user to securely grip the device. The expandable device further may act as a stand or platform for the device as well as function as a cord-retention mechanism for headphones or other cables.

In some environments, foldable portable electronic devices may be configured to fold backwards, such that the rear surface of the device becomes sandwiched between the front surface. In some approaches, such a folded configuration may not provide the necessary clearance for the expandable device to occupy this space. In other cases, foldable portable devices are configured to open in a wallet-type manner. In still other cases, foldable portable devices may be configured to change form in response to a bending- or folding-force applied by the user. In each of these cases, such bending or folding creates handling, ergonomic and/or weight-distribution challenges for the user. To that end, one aspect of the disclosure is to provide an expandable device that is configured to be effectively used as a grip, a stand, or to otherwise facilitate handling of foldable portable electronic devices. For example, the expandable devices described herein allows a button, usable as a grip, to move to various locations or regions of the expandable device in order to be positioned outside of the physical space occupied by the foldable portable electronic device when in the folded position. In other words, the expandable devices described herein accommodate for the folding of the device, and may still be used as a gripping and/or storage mechanism when the device is in the folded position.

Figure 1:
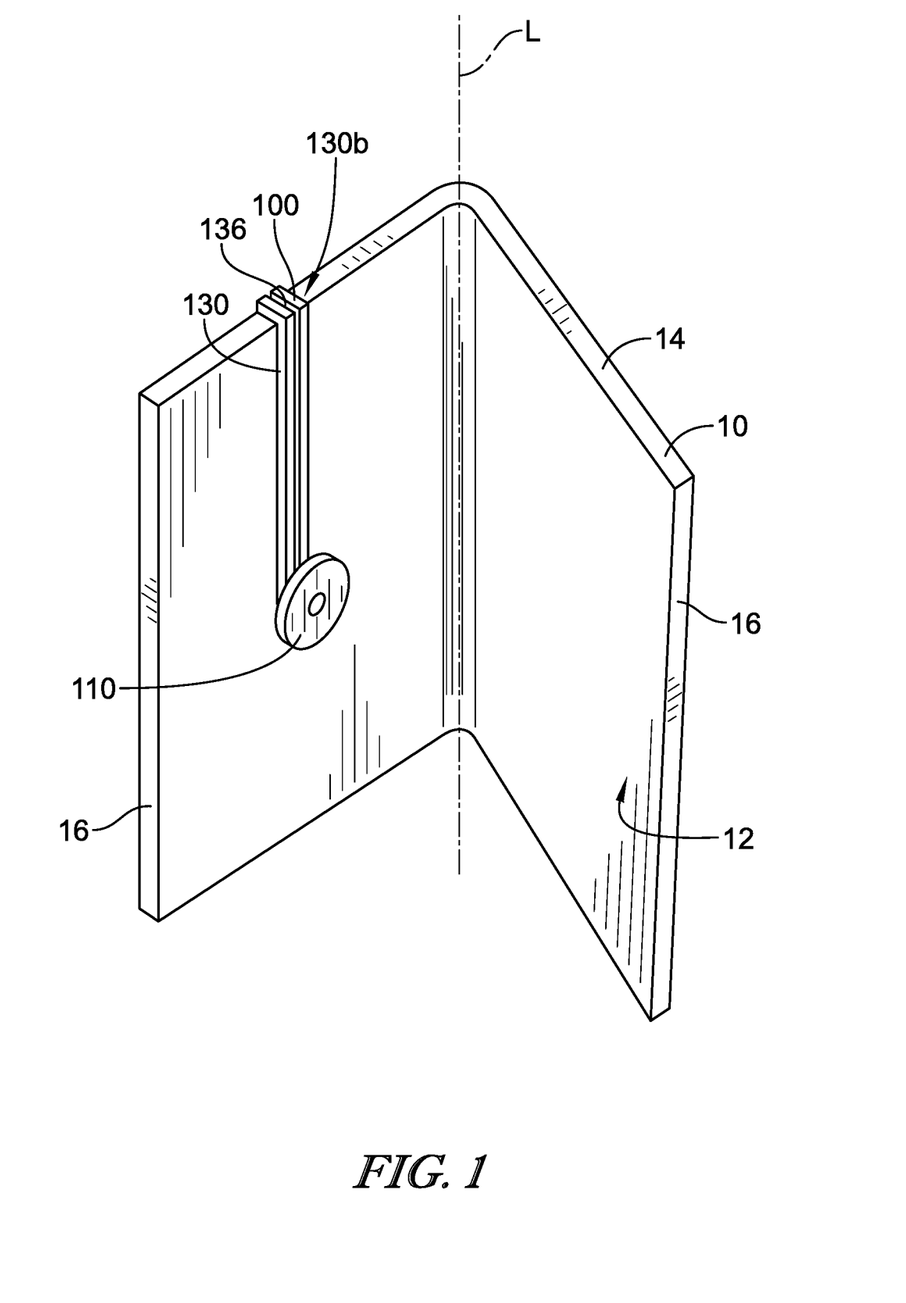
FIG. 1 illustrates a perspective view of an example expandable device coupled to a foldable electronic device in a first position in accordance with various embodiments.
Figure 2:
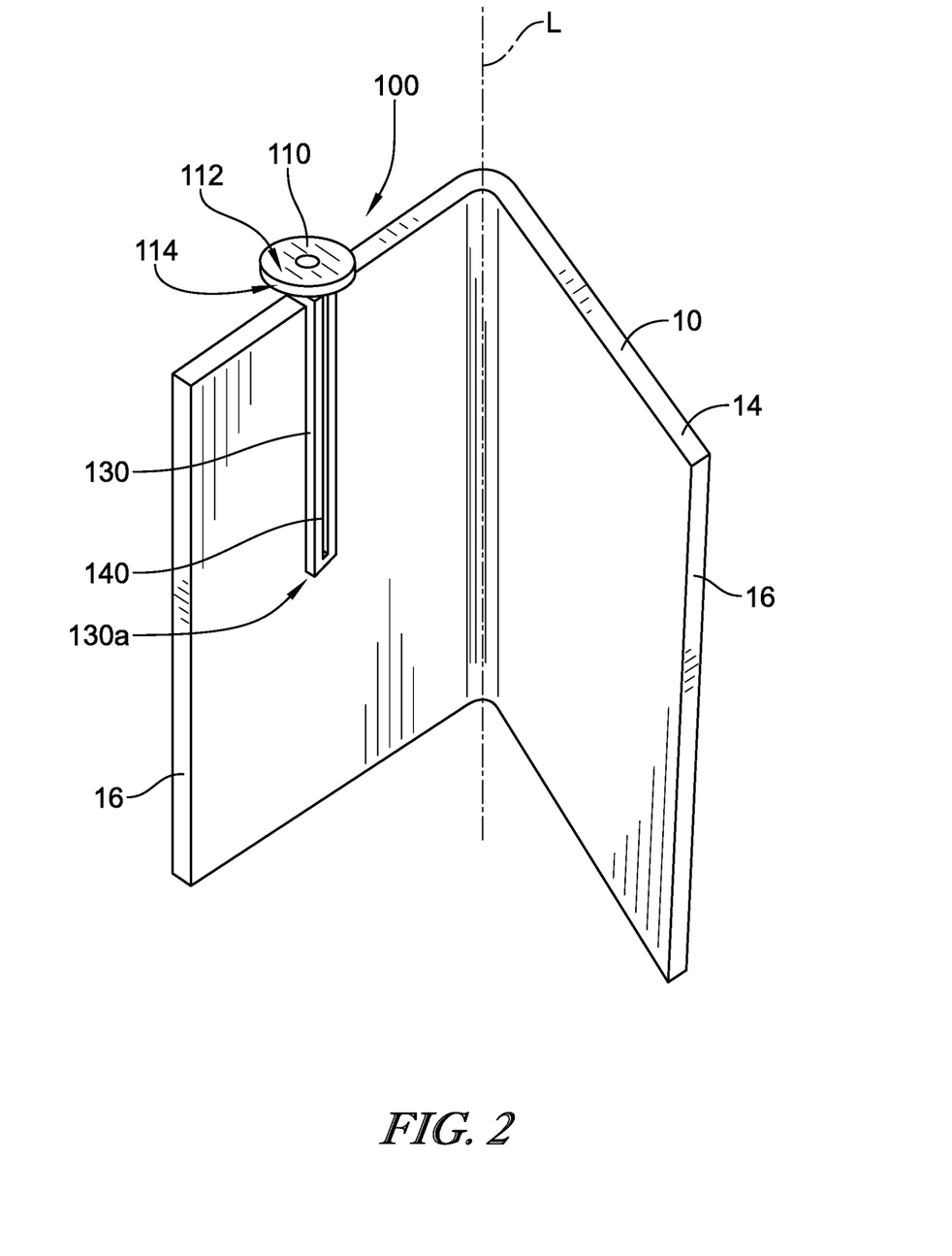
FIG. 2 illustrates a perspective view of the expandable device of FIG. 1 in a second position in accordance with various embodiments.
Figure 3:
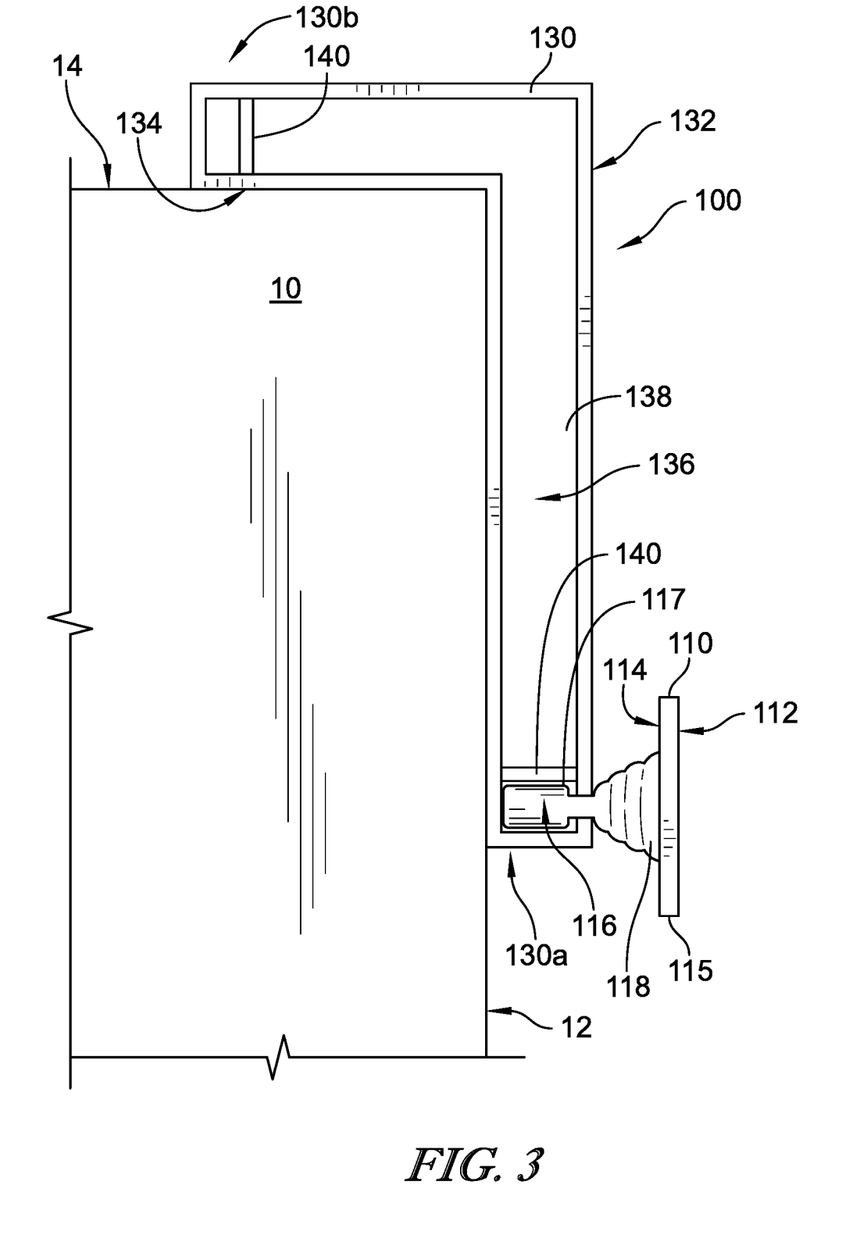
FIG. 3 illustrates a cross-sectional view of the expandable device coupled to the foldable electronic device of FIGS. 1 and 2 in the first position in accordance with various embodiments.

With reference now to the figures, one example of an expandable device 100 coupled to a foldable electronic device 10 is shown in FIGS. 1-3. Briefly, the foldable electronic device 10 includes a front surface (not illustrated) that includes a screen or display, a rear surface 12, an upper surface 14, and side surfaces 16. The foldable electronic device 10 may be in the form of a foldable cellular telephone having a foldable screen or screens disposed on the front surface that may be selectively bifurcated in a manner that reduces the overall screen size by approximately half or any other fraction. The foldable electronic device 10 may use any number of folding mechanisms to cause the device to be folded about a folding axis L.

As illustrated in FIGS. 1-3, and in particular FIG. 3, the expandable device 100 includes a button 110 having a top side 112, a bottom side 114, and a coupling portion 116, and further includes an elongated body 130 having a top side 132, a bottom side 134, and a platform coupling portion 136. The button 110 further includes a collapsible and/or expandable mechanism 118 operably coupled to the button 110 (illustrated in the expanded position in FIG. 3). In the illustrated embodiment, the coupling portion 116 is carried by, formed integrally with, and/or attached to the body 118 to selectively release or couple the button 110 to the elongated body 130.

The expandable mechanism 118 generally facilitates movement of the accessory device 100 between an expanded position and a collapsed position, and acts to retain the accessory device 100 in the desired position (expanded or collapsed) when coupled to a portable electronic device such as the foldable device 10. It should further be appreciated that the expandable mechanism 118 similarly may take the form of an outer case, enclosure, shell, deformable cover, etc., and may include a resilient member (e.g., a coil spring) that is arranged between the button 110 and the coupling portion 116.

As previously noted, the button 110 includes the top or upper side 112, the bottom or inner side 114, and also includes a rim or edge 115 and is operably coupled to the expandable mechanism 118. The button 110 may have a circular shape. In other examples, however, the button 110 may have a rectangular, square, triangular, annular, irregular, or other shape. The button 110 is preferably constructed from metal or plastic material, though other suitable materials can be used.

As stated, the button 110 can be removable from the expandable device 100, and may be selectively secured to the elongated body 130 of the expandable device 100. The button 110 may have artistic value (e.g., the button 110 may include an artistic rendering, a logo, a symbol, text, or a decal), and the button 110 may provide a grip that allows a user to slide their fingers between the bottom side 114 and the elongated body 130 when the expandable mechanism 118 is in the expanded position (when, for example, the button 110 is coupled to the portable electronic device 10) such that the top side 112 of the button 110 is disposed adjacent to the palm of the user's hand, and may also provide a space in which a cord, such as a cord for earphones, may be wrapped and stored around a portion of the expandable mechanism 118 and/or the elongated body 130.

Generally, the expandable mechanism 118 is used to move from the expanded position to the collapsed position by overcoming any biasing forces applied by resilient members. This may be accomplished by grabbing or grasping the button 110 and moving (e.g., pushing) the button 110 towards the elongated body 130. The expandable device 100 may include any number of retaining components and/or mechanisms to maintain the expandable device 100 in the collapsed position. The button 110 may be positioned in the expanded position by grasping or pulling the button 110 away from the elongated body 130 with a sufficient force to overcome the force of any retaining components used to secure the expandable device 100 in the collapsed position. Upon doing so, if the expandable device 100 is equipped with a resilient member or members, the button 110 will be urged towards, and maintained in, the expanded position.

The elongated body 130 may have any desired shape that is generally elongated and is preferably constructed from a metal or a plastic material, though other suitable materials (e.g., cardboard) can be used. In the illustrated example, the platform coupling portion 136 is in the form of a channel or track 138 that slidably receives the coupling portion 116, which, in the illustrated example, is in the form of a button protrusion or ball 117. When disposed within the track 138, the button protrusion 117 may rotate freely therein, and can slide between a first end 130a of the elongated body 130 and a second end 130b of the elongated body 130. The button protrusion 117 may be releasably coupled within the track 138 via any number of approaches.

In the illustrated example, the elongated body 130 is generally "L" shaped such that the first end 130a is positioned on the rear surface 12 of the electronic device 10 and the second end 130b is positioned on the upper surface 14 of the electronic device 10. In other words, the elongated body 130 has an approximately 90° turn in direction that corresponds to the shape of the electronic device 10. In some examples, the second end 130b of the elongated body 130 may be positioned on one of the side surfaces 16 or a lower surface (not illustrated) of the device 10. In some examples, the elongated body 130 may be generally flexible to accommodate conforming to the shape of the electronic device 10. The elongated body 130 may be coupled to the electronic device 10 via any number of approaches such as, for example, a reusable adhesive, a hook and loop fastener, a magnetic connection, a suction device, and the like. Other examples are possible.

The track 138 extends along the elongated body 130 between the first and second ends 130a, 130b in a manner that allows the button protrusion 117 to change its direction of travel in order to traverse the length of track 138 disposed on the upper surface 14 of the electronic device 10.

In use, FIGS. 1 and 3 illustrate the button 110 positioned in a first position. The expandable device 100 may be selectively expanded or collapsed to act as a grip, a stand, a storage mechanism, and/or a retention mechanism as desired while the expandable device is positioned at the first end 130a of the elongated body 130. In this illustration, the electronic device 10 is in an opened position and the button 110 is positioned on, at, and/or near the rear surface 12 of the electronic device 10. If a user wishes to convert the electronic device 10 to the closed position, as illustrated in FIG. 2, the user may slide the button 110 along the track 138 to the second end 130b of the elongated body 130 where the button 110 is positioned in a second position disposed along the upper surface 14 (or, in other examples, along one of the side surfaces 16 or the lower surface). When the button 110 is in this second position, the electronic device 10 may be folded or closed without interfering with the button 10.

In some examples, and as illustrated in FIG. 3, the track 138 may include any number of locking mechanisms 140 to retain the button 110 at desired locations along the track 138. For example, a first locking mechanism 140 may be positioned at the first end 130a of the elongated body 130 to retain the button 110 in the first position, and a second locking mechanism 140 may be positioned at the second end 130b of the elongated body 130 to retain the button 110 in the second position. In the illustrated example, the locking mechanisms 140 are in the form of a detent formed along the track 138 that frictionally engages the button protrusion 117 to retain the button 110. In other forms, the locking mechanism 140 may be in the form of a bump or protrusion, a magnetic member, or any other mechanism. Other examples are possible.

Figure 4:
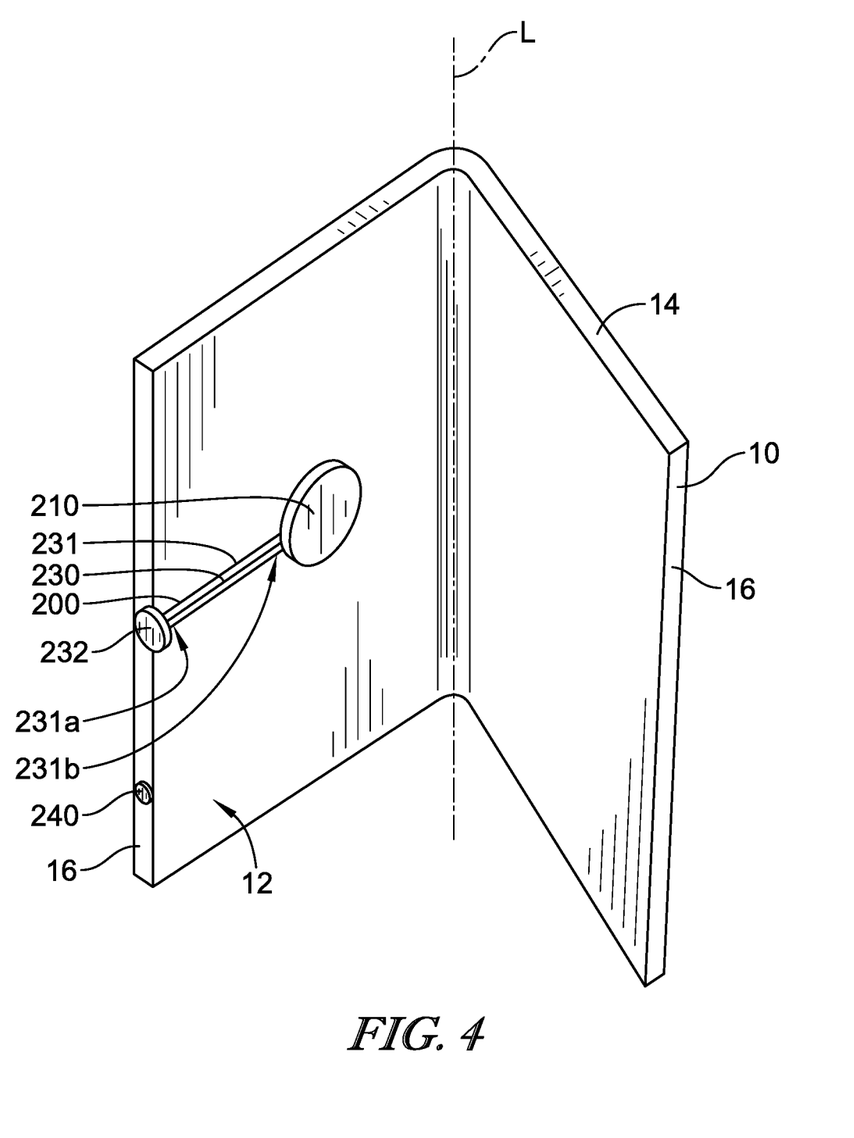
FIG. 4 illustrates a perspective view of an example expandable device coupled to a foldable electronic device in a first position in accordance with various embodiments.
Figure 5:
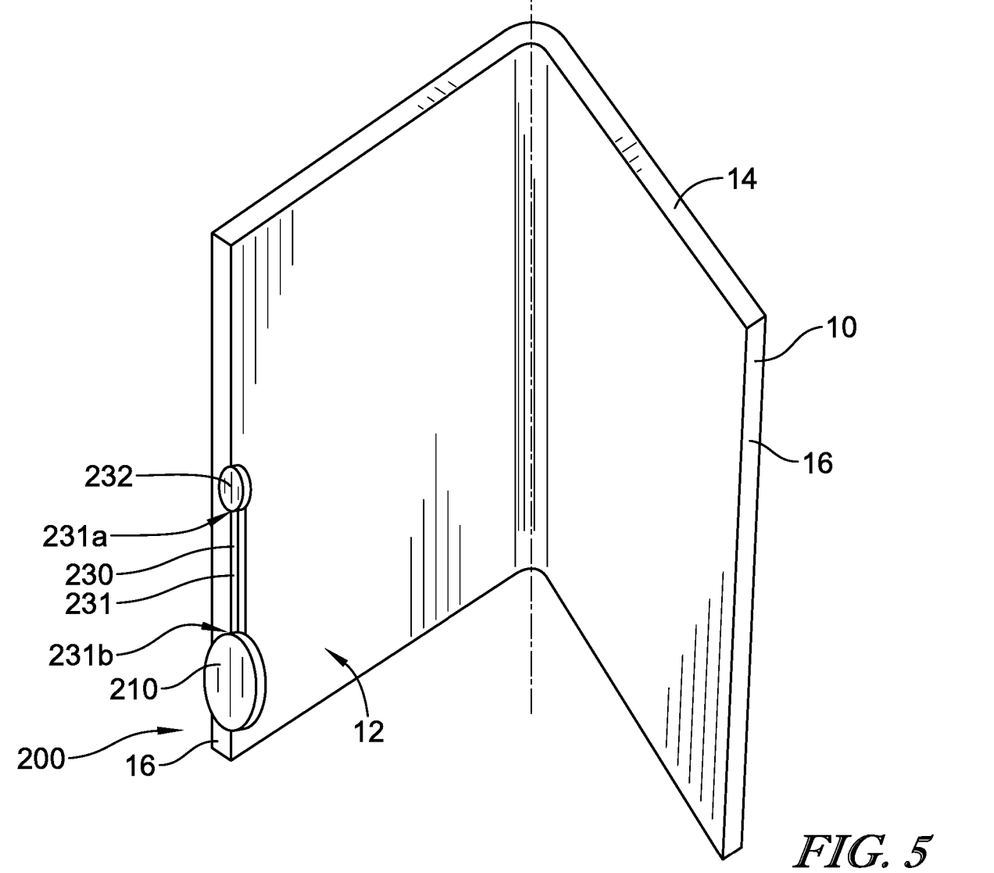
FIG. 5 illustrates a perspective view of the expandable device of FIG. 4 in a second position in accordance with various embodiments.
Figure 6:
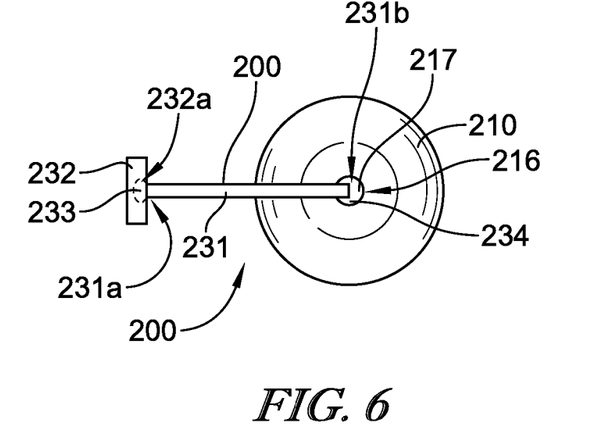
FIG. 6 illustrates a front plan view of the expandable device of FIGS. 4 and 5 in accordance with various embodiments.

FIGS. 4-6 depict another example of an expandable device 200 coupled to a foldable electronic device 10. It will be appreciated that the expandable device 200 illustrated in FIGS. 4-6 includes similar features to the expandable device 100, and thereby elements illustrated in FIGS. 4-6 are designated by similar reference numbers indicated on the example illustrated in FIGS. 1-3 increased by 100. Accordingly, these features will not be described in substantial detail.

In this embodiment, the elongated body 230 is in the form of an elongated pivot arm 231 that has a first end 231a and a second end 231b. The first end 231a of the pivot arm 231 is rotatably coupled to a pivot member 232. In the illustrated embodiment and as illustrated in FIG. 6, this coupling is in the form of a ball-and-socket engagement where the first end 231a of the pivot arm 231 carries a ball member 233 that is inserted into a socket 232a formed by the pivot member 232. The pivot member 232 is operably coupled to one of the side surfaces 16 (or, alternatively, to the top surface 14 or the bottom surface (not shown)) of the device 10 via any number of permanent- or reversible-coupling mechanisms (e.g., permanent and/or releasable adhesives, fasteners, magnets, suction devices, etc.). In such an arrangement, the ball member 233, and thus the pivot arm 231 may freely rotate within the socket along a three-dimensional space, and in other examples, the socket may include a track or guide member that constrains rotation within a single plane or other limited three-dimensional space. Further, in some examples, the pivot arm 231 may carry the socket, and the pivot member 232 may carry the ball member. Other examples are possible.

The second end 231b of the pivot arm 231 also carries a ball member 234 which is rotatably coupled to the coupling portion 216 of the button 210. The coupling portion 216 may be in the form of a socket 217 that accepts the ball member 234 carried by the pivot arm 231, or alternatively, the coupling portion 216 may be in the form of a ball member (not illustrated) that is retained within a socket (not illustrated) carried by the pivot arm 231. Such an arrangement allows the button 210 to be rotatably positioned at different angles relative to the rear surface 12 if desired. In other examples, the coupling portion 216 of the button 210 may be secured to the pivot arm 230 in a non-rotatable manner.

As with the expandable device 100, the expandable device 200 is movable between a first position (FIG. 4) where the button 210 is positioned at, on, or near the rear surface 12 of the device 10, and a second position (FIG. 5) where the button 210 is positioned at, on, or near the side surface 16, the upper surface 14, or the lower surface of the device 10. In some approaches, the pivot arm 230 may be at least partially formed from a resilient material that urges or presses the button 210 against the rear surface 12 of the device 10 to create a frictional engagement that assists in retaining the button 210 in a desired position relative to the device 10. In some examples, the pivot member 232 may be dimensioned in a way that urges the pivot arm 230 and the button 210 against the rear surface 12 of the electronic device 10. Other examples are possible.

In some examples, the expandable device 200 may include a locking mechanism 240 disposed on the side surface 16 and/or the top surface 14 (or the bottom surface) of the device 10. This locking mechanism 240 may be in the form of a protrusion (e.g., a bulb, a barb, a detent, a button, etc.) that engages the pivot arm 231 and/or a portion of the button 210 to retain the pivot arm 231 in the second position (i.e., the position that allows the expandable device 10 to be moved to the folded position). Further, an additional locking mechanism in the form of a protrusion (not illustrated) may be disposed on the rear surface 12 of the device 10 to retain the expandable device 100 in the first position. The locking mechanism(s) 240 may be removable to allow for repositioning as desired. In other examples, the pivot member 232 may carry a locking mechanism (not illustrated) in the form of a detent that frictionally engages a portion of the first end 231a of the pivot arm 231. This detent may retain the button 210 in the first and/or the second position. Other examples of retention and/or locking mechanisms are possible.

Figure 7A:
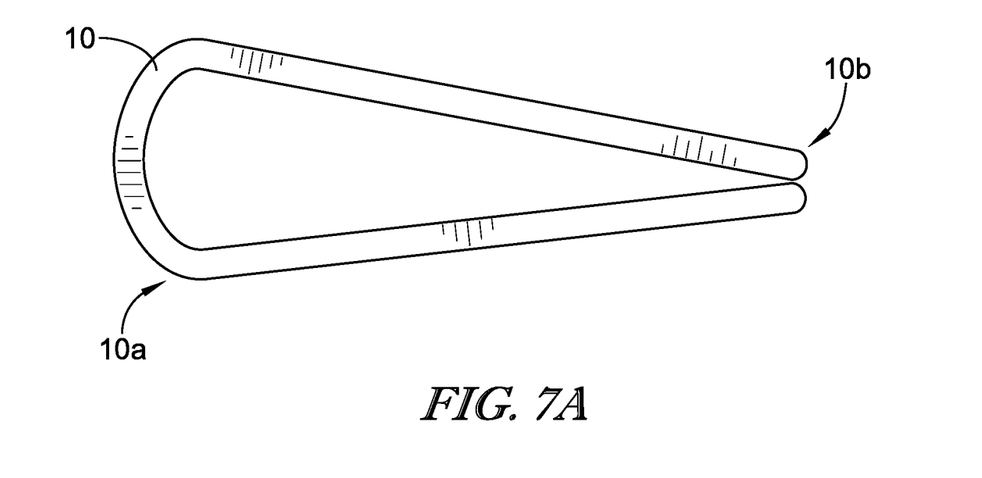
FIG. 7A illustrates a top plan view of an example foldable electronic device that does not include an expandable device coupled thereto in accordance with various embodiments.
Figure 7B:
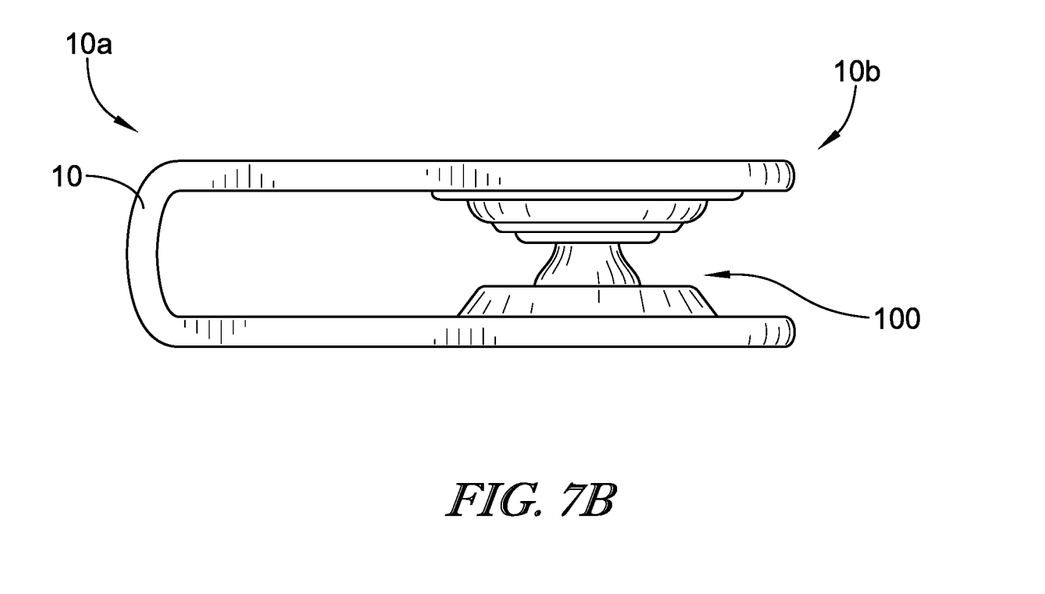
FIG. 7B illustrates a top plan view of an example foldable electronic device that includes an expandable device coupled thereto in accordance with various embodiments.

So configured, the expandable devices described herein are movable to a position that allows the foldable electronic device 10 to be folded or closed. As illustrated in FIGS. 7A, in a foldable electronic device 10 that is in the folded position and that does not include an expandable device as disclosed herein, the device may have one tall collapsed height side 10a and one short collapsed height side 10b. However, as illustrated in FIG. 7B, when the expandable devices described herein are coupled to the folding electronic device 10, the two sides of the device 10a, 10b are parallel, thus providing different viewing angles and usability.

Figure 8A:
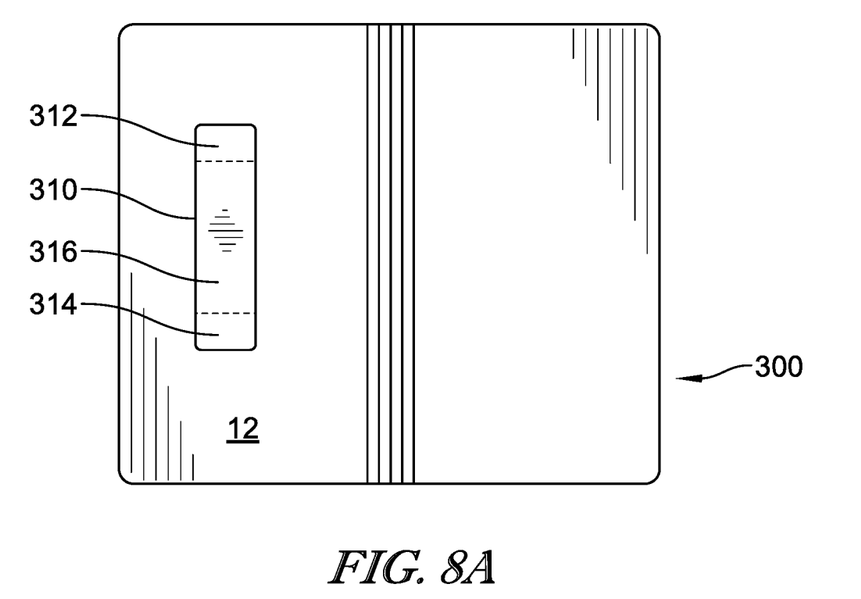
FIG. 8A illustrates a rear elevation view of an example expandable device coupled to a foldable electronic device in accordance with various embodiments.
Figure 8B:
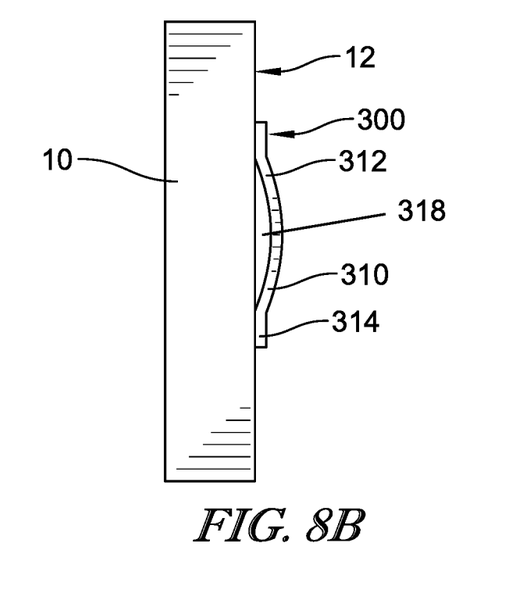
FIG. 8B illustrates a side elevation view of the example expandable device of FIG. 8A in accordance with various embodiments.

With reference now to FIGS. 8A and 8B illustrating an expandable device 300 coupled to a foldable electronic device 10, it will be appreciated that the expandable device 300 illustrated in FIGS. 8A and 8B includes similar features to the expandable devices 100, 200, and thereby elements illustrated in FIGS. 8A-8B are designated by similar reference numbers indicated on the embodiment illustrated in FIGS. 1-6 increased by 100 or 200, respectively. Accordingly, these features will not be described in substantial detail.

Expandable device 300 includes an elongated body 310 having a first end 312, a second end 314, and an elongated length 316 extending between the first and second ends 312, 314, thereby forming a grip band that lays flat inside the fold of the foldable electronic device 10. The expandable device 300 may be constructed from a flexible material such as elastic or any other material. The first and second ends 312, 314 of the expandable device 300 may be adhered to the foldable electronic device 10 using any number of approaches such as, for example, adhesives, fasteners, and the like.

As with the expandable devices above, expandable device 300 is configured to assume different positions, including a first position such that, when the first and second ends 312, 314 of the expandable device 300 are secured to the foldable device 10, an opening 318 is formed between the elongated length 316 and the rear (or other) surface 12 of the foldable device 10. The opening 318 is dimensioned to accommodate all or some of a user's hand. In the unfolded position, a user's hand may slip through the opening 318 of the expandable device 300 to secure the device. In some examples, the expandable device 300 may be constructed from a material that generally retains an arced shape to accept a user's hand. The expandable device 300 may be further configured to assume a second position in which the expandable device 300 is in a generally flattened position that rests against the rear surface 12 of the device 10 when not in use.

Figure 9A:
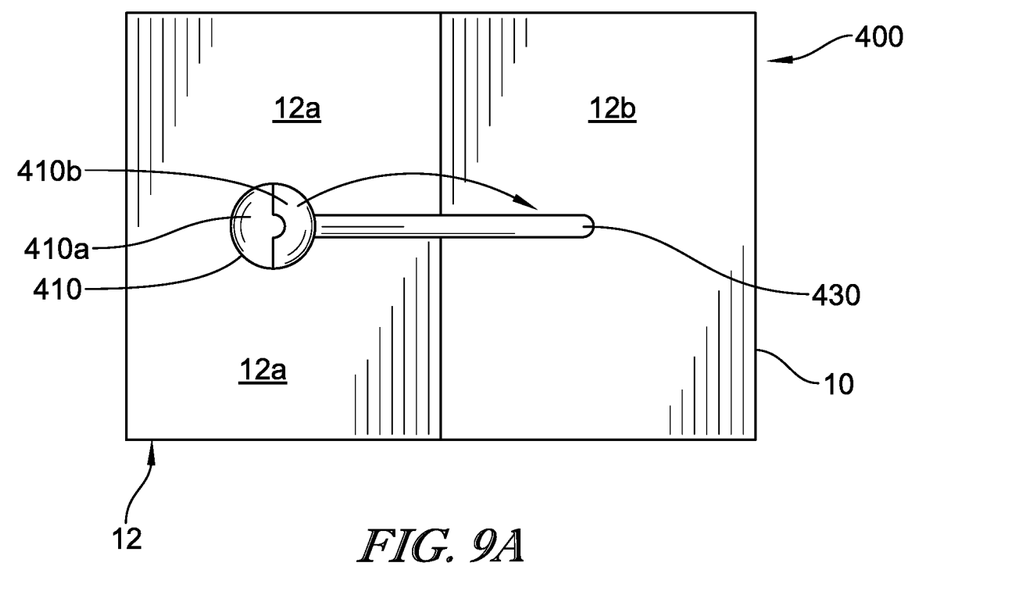
FIG. 9A illustrates a rear elevation view of an example expandable device coupled to a foldable electronic device in a first position in accordance with various embodiments.
Figure 9B:
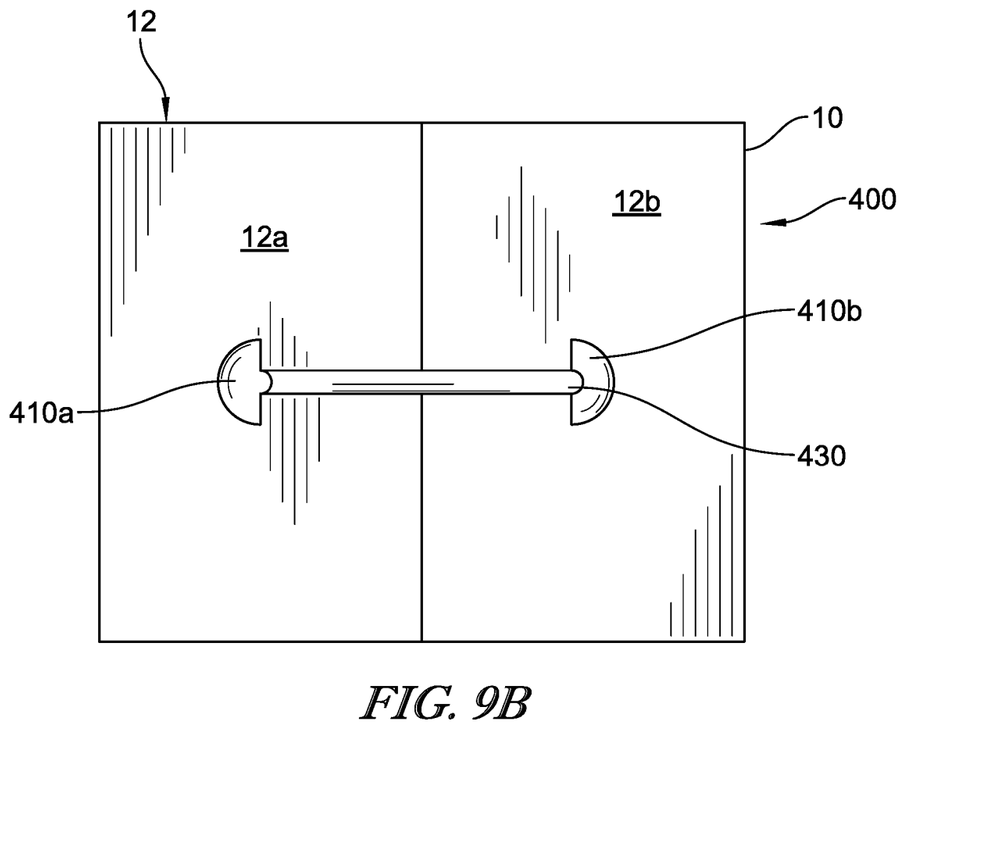
FIG. 9B illustrates a rear elevation view of the expandable device of FIG. 9A in a second position in accordance with various embodiments.
Figure 9C:
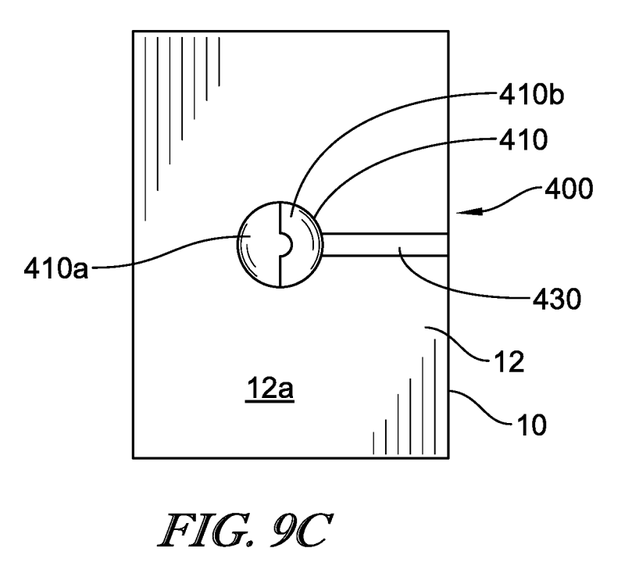
FIG. 9C illustrates a rear elevation view of the expandable device of FIGS. 9A and 9B where the foldable electronic device is in a folded position in accordance with various embodiments.

With reference now to FIGS. 9A-9C, an exemplary expandable device 400 coupled to a foldable electronic device 10 is illustrated. It will be appreciated that the expandable device 400 illustrated in FIGS. 9A-9C may include similar features to the expandable devices 100, 200, and 300, and thereby elements illustrated in FIGS. 9A-9C are designated by similar reference numbers indicated on the embodiment illustrated in FIGS. 1-8B increased by 100, 200, or 300, respectively. Accordingly, these features will not be described in substantial detail.

The expandable device 400 includes a button 410 that has a first portion 410a and a second portion 410b that can be operably coupled to each other. In some examples, the first portion 410a of the button 410 and the second portion 410b of the button 410 may interlock to couple to each other. The device 400 further includes an elongated body 430 in the form of a track or sliding mechanism that extends from a first segment 12a of the rear surface 12 of the foldable electronic device 10 to a second segment 12b of the rear surface 12 of the foldable electronic device 10.

FIG. 9aA illustrates the device in a first position, where the first and second portions 410a, 410b of the button 410 are coupled to each other. The device 400 may be used as a stand, a grip, and/or a retention mechanism as previously described. Turning to FIG. 9B, if a user wishes to have an additional stand for the device 10 when in an unfolded position, the second portion 410b of the button 410 may be movable along the sliding mechanism 430 to a second position such that the second portion 410b of the button 410 is positioned on the second segment 12b of the rear surface 12. Accordingly, the electronic device 10 may be gripped or retained at two locations to provide for increased stability. As illustrated in FIG. 9C, a user may return the second portion 410b of the button 410 to a position that interlocks with the first portion 410a of the button 410 before folding the device 10.

In some instances, the expandable device of the current disclosure may at least partly take the form of a commercially available grip and stand product such as that available on www.popsockets.com. For example, U.S. Pat. No. 8,560,031, filed on Feb. 23, 2012; U.S. Pat. No. 9,970,589, filed on Nov. 9, 2017; U.S. application Ser. No. 15/615,900, filed on Jun. 7, 2017 (now U.S. Pat. No. 10,054,259); U.S. application Ser. No. 15/679,934, filed on Aug. 17, 2017 (now U.S. Pat. No. 10,060,573); U.S. application Ser. No. 15/803,410, filed on Nov. 3, 2017 (now U.S. Pat. No. 9,958,107); U.S. application Ser. No. 15/808,076, filed on Nov. 9, 2017 (now U.S. Pat. No. 9,970,589); U.S. application Ser. No. 15/864,402, filed on Jan. 8, 2018 (published as US 2019/0138052); U.S. application Ser. No. 15/864,509, filed on Jan. 8, 2018 (now U.S. Pat. No. 10,463,116); U.S. application Ser. No. 15/906,920, filed on Feb. 27, 2018 (now U.S. Pat. No. 10,215,329); U.S. application Ser. No. 15/922,601, filed on Mar. 15, 2018 (now U.S. Pat. No. 10,030,807); U.S. application Ser. No. 15/952,025, filed on Apr. 12, 2018 (now U.S. Pat. No. 10,386,009); U.S. application Ser. No. 15/993,458, filed on May 30, 2018 (now U.S. Pat. No. 10,348,352); and U.S. application Ser. No. 16/001,723, filed on Jun. 6, 2018 (now U.S. Pat. No. 10,317,005) each describe suitable expandable grip and stand products, which also incorporate collapsible mechanisms and may form at least part of the disclosure herein, and therefore the entirety of each is hereby incorporated by reference.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An expandable device for attachment to a portable electronic device having a first surface and a second surface, the expandable device comprising:
    a button having a top side and a bottom side, the button being movable between an expanded position and a collapsed position;
    a coupling portion operably coupled to the button; and
    an elongated body having a top side, a bottom side, and a platform coupling portion, the bottom side being adapted to engage a portion of the portable electronic device, and the platform coupling portion being adapted to operably engage the coupling portion,
    wherein when the expandable device is attached to a portable electronic device, the button is adapted to be movable between a first position where the button is positioned along the first surface of the portable electronic device and a second position where the button is positioned along the second surface of the portable electronic device, and
    wherein the elongated body comprises a track, wherein the coupling portion is slidably constrained within the track such that the button is movable between the first position and the second position.

2. The expandable device of claim 1, further comprising a locking mechanism operably coupled to at least one of the button or the elongated body to selectively retain the button in one of the first position or the second position.

3. The expandable device of claim 1, wherein when the expandable device is attached to a portable electronic device, the elongated body extends along a portion of the first surface of the portable electronic device and a portion of the second surface of the portable electronic device.

4. The expandable device of claim 1, wherein when the expandable device is attached to a portable electronic device, the elongated body is removable from the portable electronic device.

5. The expandable device of claim 1, wherein the locking mechanism comprises at least one detent formed in the track, the detent being adapted to frictionally engage the coupling portion of the button.

6. The expandable device of claim 1, wherein the button is selectively removable from the elongated body.

7. An expandable device for attachment to a portable electronic device having a first surface and a second surface, the expandable device comprising:
    a button having a top side and a bottom side, the button being movable between an expanded position and a collapsed position;
    a coupling portion operably coupled to the button; and
    an elongated body having a top side, a bottom side, and a platform coupling portion, the bottom side being adapted to engage a portion of the portable electronic device, and the platform coupling portion being adapted to operably engage the coupling portion,
    wherein when the expandable device is attached to a portable electronic device, the button is adapted to be movable between a first position where the button is positioned along the first surface of the portable electronic device and a second position where the button is positioned along the second surface of the portable electronic device, and
    wherein the elongated body comprises an elongated pivot arm having a first end and a second end, wherein the first end of the pivot arm is coupled to a pivot member and the coupling portion is coupled to the second end of the pivot arm such that the button is movable between the first position and the second position.

8. The expandable device of claim 7, wherein when the expandable device is attached to a portable electronic device, the pivot member is at least partially disposed on the second surface of the portable electronic device.

9. The expandable device of claim 7, wherein when the expandable device is attached to a portable electronic device, the pivot member is removably coupled to the second surface of the portable electronic device.

10. The expandable device of claim 7, further comprising a locking mechanism operably coupled to at least one of the button or the elongated body to selectively retain the button in one of the first position or the second position.

11. The expandable device of claim 10, wherein the locking mechanism comprises a detent formed on the pivot member adapted to frictionally engage the first end of the pivot arm.

12. The expandable device of claim 7, wherein the locking mechanism comprises a protrusion disposed on the second surface of the portable electronic device, the protrusion being adapted to engage at least one of the pivot arm or the button to retain the pivot arm in the second position.

13. An expandable device for attachment to a portable electronic device having a first surface and a second surface, the expandable device comprising:

a button having a top side and a bottom side, the button being movable between an expanded position and a collapsed position;

a coupling portion operably coupled to the button;

an elongated body defining a top side, a bottom side, and a track, the bottom side being adapted to engage a portion of the portable electronic device, and the track being adapted to slidably engage the coupling portion;

wherein, when the expandable device is attached to a portable electronic device, the button is adapted to be movable along the track between a first position where the button is positioned along a first surface of the portable electronic device and a second position where the button is positioned along a second surface of the portable electronic device.

14. The expandable device of claim 13, wherein, when the expandable device is attached to a portable electronic device, the elongated body extends along a portion of the first surface of the portable electronic device and a portion of the second surface of the portable electronic device.

15. The expandable device of claim 13, further comprising a locking mechanism operably coupled to at least one of the button or the elongated body to selectively retain the button in one of the first position or the second position.

16. The expandable device of claim 15, wherein the locking mechanism comprises at least one detent formed in the track, the detent being adapted to frictionally engage the coupling portion of the button.

17. The expandable device of claim 13, wherein when the expandable device is attached to a portable electronic device, the elongated body extends along a portion of the first surface of the portable electronic device and a portion of the second surface of the portable electronic device.

18. An expandable device for attachment to a portable electronic device having a first surface and a second surface, the expandable device comprising:

a button having a top side and a bottom side, the button being movable between an expanded position and a collapsed position;

a coupling portion operably coupled to the button;

an elongated body having an elongated pivot arm defining a first end and a second end, the first end of the pivot arm being coupled to a pivot member, and the second end of the pivot arm being coupled to the coupling portion, the pivot member being adapted to engage a portion of the portable electronic device, wherein the pivot arm is pivotable relative to the pivot member between a first position and a second position; and a locking mechanism operably coupled to at least one of the button or the elongated body to selectively retain the button in one of the first position or the second position, wherein, when the expandable device is attached to a portable electronic device, the button is adapted to be movable between the first position where the button is positioned along the first surface of the portable electronic device and the second position where the button is positioned along the second surface of the portable electronic device.

19. The expandable device of claim 18, wherein, when the expandable device is attached to a portable electronic device, the pivot member is at least partially disposed on the second surface of the portable electronic device.

20. The expandable device of claim 18, wherein the locking mechanism comprises a detent formed on the pivot member adapted to frictionally engage the first end of the pivot arm.

21. The expandable device of claim 18, wherein the locking mechanism comprises a protrusion disposed on the second surface of the portable electronic device, the protrusion being adapted to engage at least one of the pivot arm or the button to retain the pivot arm in the second position.

* * * * *